(12) United States Patent
Yano

(10) Patent No.: US 6,681,062 B1
(45) Date of Patent: Jan. 20, 2004

(54) HANDY TYPE IMAGE SCANNER

(75) Inventor: Akihiro Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 09/644,561

(22) Filed: Aug. 24, 2000

(30) Foreign Application Priority Data

Aug. 25, 1999 (JP) .......................................... 11-238725

(51) Int. Cl.⁷ ................................................. G06K 9/22
(52) U.S. Cl. ..................................................... 382/313
(58) Field of Search ................................ 382/312–313, 382/323, 324; 358/296, 472, 473; 235/462.45

(56) References Cited

U.S. PATENT DOCUMENTS

| | | | | |
|---|---|---|---|---|
| 4,750,049 A | * | 6/1988 | Murakami et al. | 358/296 |
| 4,901,164 A | * | 2/1990 | Kurosawa | 358/473 |
| 5,115,227 A | * | 5/1992 | Keiji | 345/164 |
| 5,365,605 A | * | 11/1994 | Hosogoe et al. | 382/313 |
| 6,081,630 A | * | 6/2000 | Kaneko | 382/313 |

FOREIGN PATENT DOCUMENTS

JP  6-291935  10/1994

* cited by examiner

*Primary Examiner*—Jose L. Couso
(74) *Attorney, Agent, or Firm*—Sughrue Mion, PLLC

(57) ABSTRACT

A handy scanner equipped with rollers in a lower surface of a bottom plate thereof includes a bank portion protruding downward from the lower surface of the bottom plate and provided to surround a periphery of an FAP protruding downward from the same lower surface such that the FAP does not contact with a surface of an original. Downward protruding distances of the bank portion and rollers are determined such that at least a portion of the bank portion and the rollers can contact with a surface of an original simultaneously and, preferably, a difference in vertical level between lower ends of the bank portion and the FAP is set such that CTF of the handy scanner becomes 30% or more.

19 Claims, 8 Drawing Sheets

DISTANCE (μm) BETWEEN ORIGINAL AND FAP

HANDY TYPE IMAGE SCANNER

BACKGROUND OF THE INVENTION

1. Field of the Invention

The present invention relates to a handy type image scanner and, particularly, to an improvement of a structure of a bottom portion of a body of a handy type image scanner employing a contact type image sensor.

2. Description of the Prior Art

The handy type image scanner, which is also called as a hand held printed matter scanning device, can pick up an image of an original as an image data for a personal computer by holding a body of the handy type image scanner by a hand of an operator and scanning the original by moving the scanner manually with respect to the original. The handy type image scanner is utilized as a peripheral device of a desk-top or notebook type personal computer. The handy type image scanner includes a contact type image sensor composed of a linear line of tightly arranged photo-electric conversion elements. An image of one full page of a thing such as an original, a photograph or a printed matter is read out by hand-holding the handy type image scanner, putting it on the page of the thing with the linear line of the tightly arranged photo-electric conversion elements of the contact type image sensor thereof being in a main scan direction and manually scanning the one page in a sub scan direction, while electrically scanning the photo-electric conversion elements in the main scan direction.

A conventional handy type image scanner of this type comprises, in addition to the contact type image sensor, rollers for allowing the handy type image scanner to smoothly scan along a surface of the original in the sub scan direction, a transmission unit ganged with the rollers to sense a relative moving distance of the image sensor with respect to the original and a casing, which houses all of the above mentioned components.

The transmission unit is constructed with, for example, a rotary encoder and a gear train for transmitting an amount of rotation of the roller to the encoder.

There are several types of construction of the contact type image sensor. In this description, however, one of them, which is disclosed in Japanese Patent Application Laid-open No. H6-291935, will be referred to as an example.

FIG. 1 is a schematic perspective view of the disclosed conventional contact type image sensor. In FIG. 1, a light emitting diode (LED) array 1 is a linear light source composed of, for example, a plurality of LED's arranged in a linear line. Illumination light 5 emitted from the LED array 1 illuminates an original 4 and signal light 6, which is the illumination light 5 reflected from a surface of the original, is collimated by a rod lens array 3. The signal light 6 passed through the rod lens array 3 is collimated on surfaces of a plurality of optical sensor elements provided on an image sensor substrate 2 whose area size is the same as that of the original 4, to read an image of the original 4. The illumination light 5 emitted from the LED array 1 is featured by that it is incident on a surface of the original obliquely. Furthermore, although the image sensor is referred to as of the contact type, a space A is required between the surface of the original and a lower surface of the image sensor substrate 2 since the rod lens array is used. The space A is usually 10 mm to 20 mm.

FIG. 2 is a schematic perspective view of another example of the conventional contact type image sensor. In FIG. 2, illumination light 5 emitted from an LED array 1 illuminates a plurality of sensor elements 7 provided on a lower surface of an image sensor substrate 2. Each sensor element 7 is formed in a peripheral portion with a plurality of openings (not shown) for allowing the illumination light 5 to pass therethrough. The illumination light 5 passed through these openings formed in the peripheral portions of the sensor elements enters into optical fibers 12 provided in a fiber array plate 11 to illuminate an original 4. Signal light 6, which is the illumination light 5 reflected from the original 4, passes through the optical fibers 12 in a reverse direction to the sensor elements 7 to read the signal, respectively. A roller 10 functions to move the original 4 in a sub scan direction.

Although not shown, a plurality of switching elements for switching the respective optical sensor elements in order to scan the original 4 in a main scan direction by the optical sensor elements and output read-out signals of the respective optical sensor elements in time series, a drive circuit for driving these switching elements and a wiring therefor are provided on the image sensor substrate, in addition to the plurality of the optical sensor elements.

Now, an operation of the handy type image scanner will be described with reference to FIGS. 3A and 3B, in which FIG. 3A is a schematic functional cross section of the conventional handy type image scanner mounted with the conventional contact type image sensor shown in FIG. 1 and FIG. 3B is a bottom view of the handy type image scanner shown in FIG. 3A.

In this handy type image scanner, the contact type image sensor is provided within a housing 51 composed of a cover member 52 and a bottom plate 53. The roller 10 and a pair of rollers 50A and 50B are provided in the bottom plate 53 and the rod lens array 3 of the contact type image sensor is provided in the housing 51.

For a reading in a main scan direction in parallel to a horizontal direction in FIG. 3B, image signals in the form of photoelectric charge corresponding to luminous energy are read out sequentially from the respective optical sensors on a lower surface of the image sensor substrate 2 of the contact type image sensor. In reading the image signals, the illumination light 5 emitted from the LED array 1 passes through the bottom plate 53 to the original 4 and the signal light 6, which is the illumination light 5 reflected from the original 4, is collimated by the rod lens array 3, so that luminous energy of the signal light is read out by the optical sensor elements on the image sensor substrate 2.

For a reading in the sub scan direction in parallel to a vertical direction in FIG. 3B, the operator slides the handy type image scanner vertically on the original 4 with an aid of the rollers 10, 50A and 50B. In this case, the reading position of the handy type image scanner with respect to the original is detected by the rotary encoder ganged with the roller 10 through the gear train. Although three rollers are used in the shown case, the number of rollers is determined such that a distance between the original 4 and the image sensor substrate 2 is maintained constant and a smooth movement of the handy type image scanner with respect to the original is obtained.

This structure is featured by that it is necessary to provide a space between the rod lens array 3 constituting the contact type image sensor and the upper surface of the original since the illumination light 5 from the LED array is incident on the original obliquely and that a distance between the upper surface of the rod lens array 3 and the lower surface of the image sensor substrate 2 is made equal to the distance between the lower surface of the rod lens array 3 and the original by positioning the lower surface of the rod lens array 3 coplanar with or inside of the lower surface of the bottom plate 53. Furthermore, the housing 51 can slide smoothly on the surface of the original with the aide of the three rollers.

The reading in the main scan direction is performed in the same manner as that of the described contact type image sensor.

As to the reading in the sub scan direction, the operator manually slides the handy type image scanner vertically on the original 4 by utilizing the rollers. In this case, the reading position of the handy type image scanner with respect to the original is detected by the rotary encoder ganged with the roller 10 through the gear train, which is not shown.

In the case of the handy type image scanner shown in FIGS. 3A and 3B, the size of the housing 51 becomes large since the distance must be provided between the LED array 1 and the image sensor substrate 2 and the distance between the rod lens array 3 and the image sensor substrate 2 must be made equal to the distance between the rod lens array 3 and the original 4. Therefore, the merit of the portability of the handy type image scanner is degraded.

Furthermore, the rigidity of the housing is degraded, so that it tends to be warped. With warping of the housing, which may be caused in assembling it, and/or warping thereof caused by pressure applied thereto during a scanning operation, the rotation of the rollers 10, 50A and 50B may become irregular, resulting in vibration of the handy type image scanner hand held by an operator.

As mentioned, the size of the housing of the handy type image scanner, which uses the contact type image sensor shown in FIGS. 3A and 3B employing the rod lens array 3, is increased by the facts that the original 4 is illuminated with the oblique illumination light incident thereon and that the distance between the lower surface of the rod lens array 3 and the original is made equal to the distance between the upper surface of the rod lens array 3 and the lower surface of the image sensor substrate 2.

Contrary to the contact type image sensor shown in FIGS. 3A and 3B, in the contact type image sensor shown in FIG. 2, the lower surface of the optical fiber array plate (FAP) 11, which is the optical system for picking up the image, is coplanar with the upper surface of the original 4, which is substantially the same in vertical level as the peripheral surface of the roller 10, so that resolution of the picked-up image is improved. Furthermore, since it is possible to arrange the LED array 1 immediately above the sensor elements 7 and there is no need of providing a distance between the surface of the original 4 and the FAP 11, the size of the handy type image scanner may be reduced by applying the contact type image sensor shown in FIG. 2 thereto instead of the image sensor shown in FIGS. 3A and 3B.

In the case where the structure of the contact type image sensor shown in FIG. 2 is applied to the handy type image scanner as it is, however, the lower surface of the FAP 11 is made in direct contact with the upper surface of the original 4. Therefore, due to friction between the lower surface of the FAP 11 and the original, the scanning of the original by means of the scanner may become irregular, so that an image picked up thereby may be distorted.

Particularly, such phenomenon may become substantial for an original having an upper surface, which is not smooth but contains irregularity such as steps. Typical example may be a case where an image to be picked up by the scanner is a printed pattern of clothes, which are not completely flat.

The lower surface of the FAP 11, which becomes in contact with the upper surface of the original, is usually formed of glass material. However, since the glass surface is exposed externally, there may be a case where the glass is broken when an operator erroneously drops the handy type scanner.

Furthermore, the bottom plate of the handy type image scanner is usually formed by plastic molding, metal die casting or metal pressing. However, it is necessary to form through-holes in the bottom plate through which the rollers and the FAP are exposed externally.

In the case of the contact type image sensor using the FAP 11 shown in FIG. 2, the reduction of the size of the handy type image scanner is possible for the reason mentioned previously. However, in order to improve the resolution, the FAP 11 has to be in direct contact with the surface of the original. Therefore, the manual scanning operation may become irregular due to friction therebetween.

Furthermore, as mentioned above, the rigidity of the handy type image scanner is relatively low since the FAP 11 made of glass material protrudes externally, it may be broken relatively easily and, since the bottom plate of the handy type scanner has the through-holes in positions respectively corresponding to the rollers and the FAP 11. It may be possible to provide the rollers in a front and rear sides of the FAP 11 to thereby lift up the FAP 11 slightly, as shown in FIGS. 3A and 3B. In such case, however, the number of parts and the number of mounting steps thereof are increased disadvantageously.

SUMMARY OF THE INVENTION

An object of the present invention is to provide a compact and practical handy type image scanner, which allows a smooth manual scanning operation.

Another object of the present invention is to provide a handy type image scanner having an improved rigidity.

According to the first aspect of the present invention, a handy type image scanner having rollers in a bottom plate of a housing thereof has an optical fiber array plate (FAP), which extends along a rectangular opening portion of the bottom plate. An optical sensor for detecting signal light passed through the FAP is arranged within the housing. In order to prevent the FAP externally exposed in a lower surface of the bottom plate from contacting with an upper surface of an original to be scanned, a bank portion including a pair of parallel banks are formed on both longer sides of the rectangular opening portion of the bottom plate. The bank portion protrudes downward from the lower surface of the bottom plate. A downward protruding distance of a member such as the banks, the rollers and the FAP measured from a lower surface of the bottom plate will be referred to as "height", hereinafter. The heights of the banks and the rollers are determined such that at least a portion of the banks and the rollers can contact with the upper surface of the original simultaneously.

In such handy type image scanner, a cross section of each bank is a right-angled triangle and oblique sides of the right-angled triangle cross sections of the banks are located in positions remote from the FAP.

Alternatively, in the handy type image scanner mentioned above, the cross section of the bank may be a quarter round shape, an arc portion thereof being located in a remote side of the FAP.

In the present invention, the FAP protrudes downward from the lower surface of the bottom plate of the housing and a difference in height between the bank and the FAP, that is, a gap between the upper surface of the original and the lower surface of the FAP, is preferably set such that contrast transfer function (CTF) of the handy type image scanner becomes 30% or more.

Practical examples of the step are 0.1 mm or less for resolution of the optical sensor of 200 dpi and 0.045 mm or less for resolution of the optical sensor of 300 dpi.

When the bank portion includes a bank, which completely surrounds the rectangular opening portion, mechanical strength of the bottom plate can be improved. In the case where the bank portion includes a pair of banks, it is preferable that the height of portions of the banks, which extend in a main scan direction on the remote side of the rollers, is larger than the height of the rollers. In such case, it is possible that the height of the banks positioned between the rollers and the FAP is set equal to the height of the rollers. Alternatively, the height of the banks positioned between the rollers and the FAP is set equal to the height of the FAP measured from the lower surface of the bottom plate of the housing.

Furthermore, according to the second aspect of the present invention, a handy type image scanner comprises a housing having a bottom plate equipped with rollers protruded from a lower surface of the bottom plate, a rectangular opening portion provided in the bottom plate and extending along a rotation shaft of the rollers, a rectangular FAP extending in a major axis direction of the opening portion and protruding downward from the lower surface of the bottom plate toward a side of an original, an optical sensor provided above the FAP within the housing, for detecting signal light passed through the FAP and a bank portion downwardly protruding from the lower surface of the bottom plate, for preventing the FAP downwardly protruded from the lower surface of the bottom plate from contacting with a surface of the original, wherein the heights of the bank portion and the rollers are determined such that at least a portion of the bank portion and the rollers can simultaneously contact with the surface of the original and a step in height between the bank portion and the FAP is set to 0.1 mm or less.

In this handy type image scanner, the rotation shaft of the rollers may be supported by a lower side support member protruding downward from the lower surface of the bottom plate toward the side of the original.

Furthermore, the lowest end of the bank portion preferably has a pent roof portion covering a periphery of the FAP.

The bank portion may include banks provided along only both longer sides of the rectangular opening portion. When the bank portion further includes banks provided along both shorter sides of the opening portion, the heights of the banks along the shorter sides of the opening portion is preferably smaller than the height of the long banks provided along the longer sides of the rectangular opening portion in view of reduction of contact resistance between the FAP and the surface of the original. In the same view, the banks preferably include irregularity along the length thereof.

According to the third aspect of the present invention, a handy type image scanner for picking up an image of an original comprises an FAP for guiding signal light from the original, which is provided in a bottom plate of a housing of the scanner as an image read portion, wherein the FAP is protruded downward from the bottom plate by a predetermined distance, a bank portion having a tapered or a quarter round cross section and protruding downward from the bottom plate by a distance larger than the height of the FAP by 0.03 mm or less surrounds a periphery of the FAP and rollers, whose height measured from the bottom plate is equal to the height of the bank portion and contacts with the original, are arranged in parallel to the FAP as well as the bank portion.

According to the fourth aspect of the present invention, a handy type image scanner for picking up an image of an original comprises, as an image read portion in a bottom plate of a housing of the scanner, an FAP for guiding signal light obtained in a main scan direction of the original, an optical sensor provided above the FAP, for detecting the signal light guided by the FAP, a bank portion having a tapered or a quarter round cross section and protruding downward over the FAP by 0.03 mm or less, the bank portion being provided to substantially surround a periphery of the FAP protruded from the bottom plate and a roller provided in parallel to a lengthwise direction of the FAP, for detecting a position of the original in a main scan direction by a rotation angle thereof, wherein the heights of portions of the bank portion between the FAP and the roller measured from the bottom plate are made smaller than the heights of the other portions of the bank portion and the height of the roller is made substantially the same as the height of the FAP.

BRIEF DESCRIPTION OF THE DRAWINGS

The above mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

Figure 1:
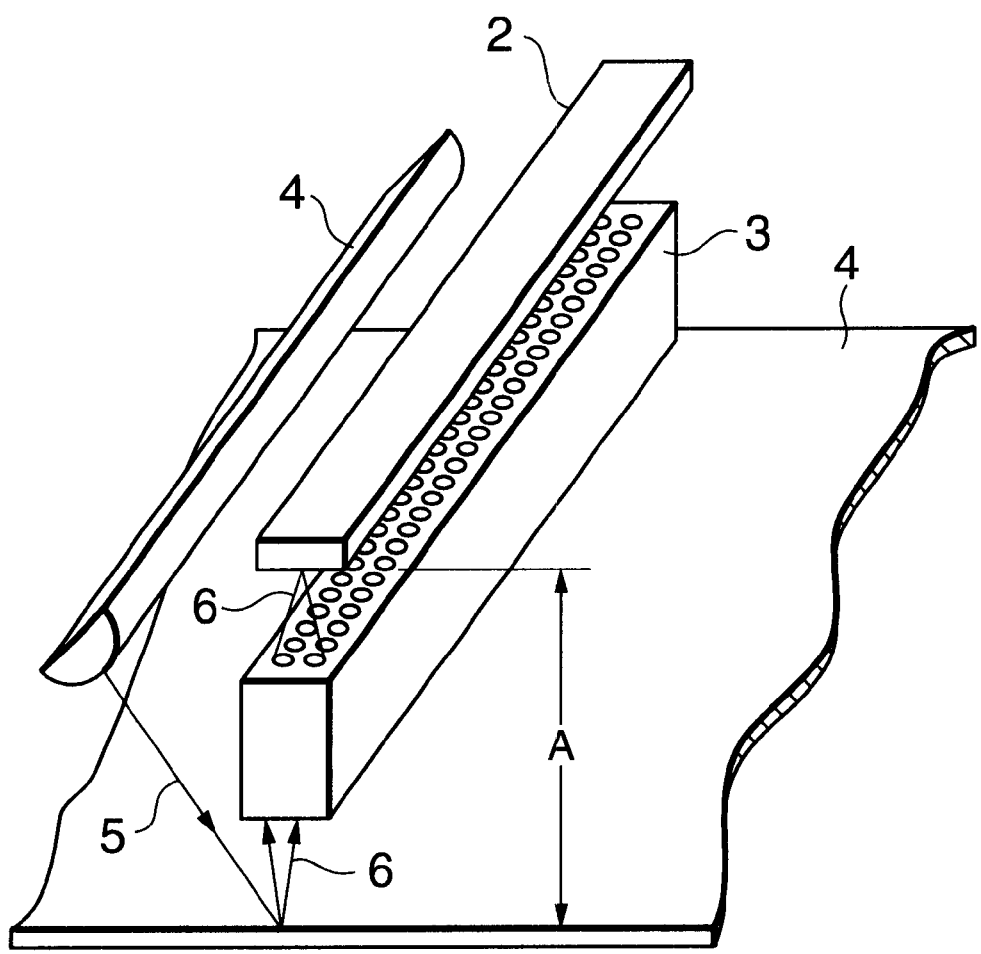
FIG. 1 is a schematic perspective view of an example of a contact type image sensor using a conventional rod lens array.

FIGS. 4A to 4D show a handy type image scanner according to the first embodiment of the present invention. In FIGS. 4A to 4D, a main body or housing 71 of the scanner is constructed with a cover member 72 and a bottom plate 73. The bottom plate 73 is provided with a pair of rollers 10 having a common rotation axis. Furthermore, a rectangular opening portion 70 is formed in the bottom plate 73 and a rectangular FAP 11 of a contact type image sensor is supported in the opening portion 70. In order to prevent a portion of the FAP 11 exposed in a lower surface of the bottom plate 73 from directly contacting with a surface of an original, a pair of banks 75 each extending downward by a distance slightly larger than a height of the FAP 11 measured from the lower surface of the bottom plate 73 are formed along longer sides of the rectangular opening 70, respectively.

Figure 2:
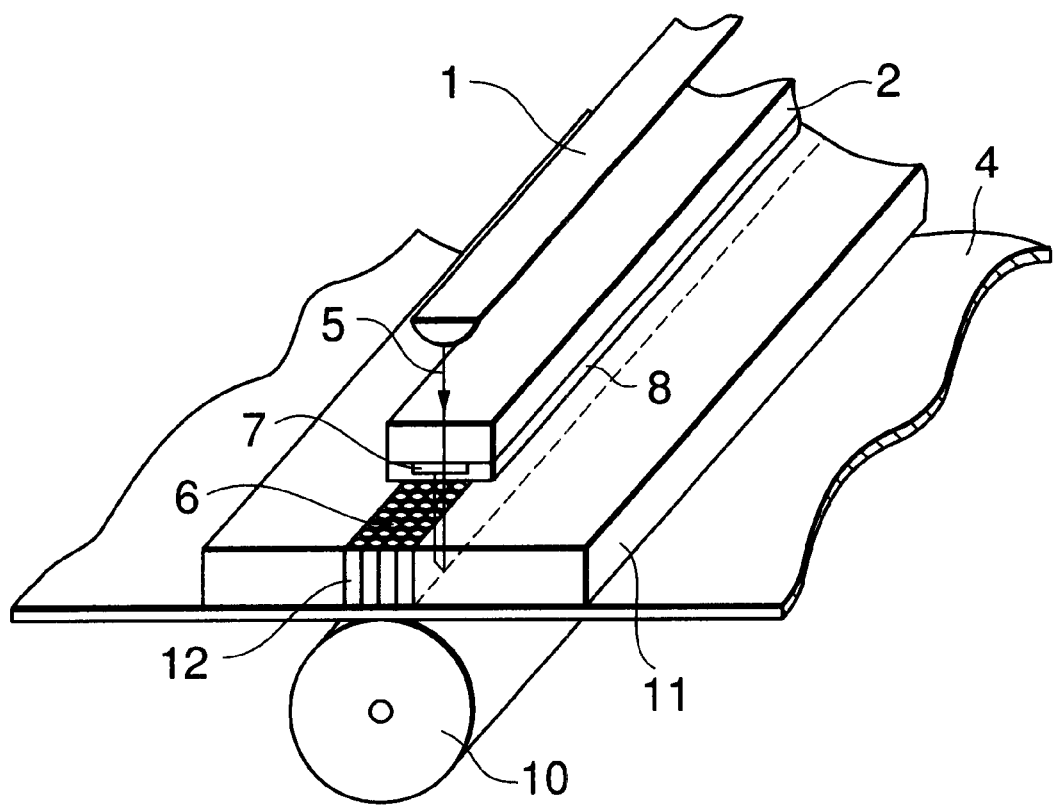
FIG. 2 is a schematic perspective view of an example of a contact type image sensor using a conventional FAP.
Figure 3A:
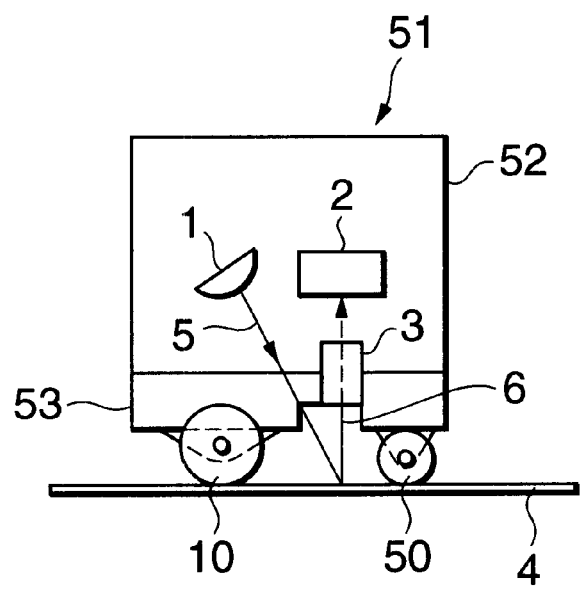
FIG. 3A is a schematic cross sectional view of a handy type scanner employing the contact type image sensor shown in FIG. 1.
Figure 3B:
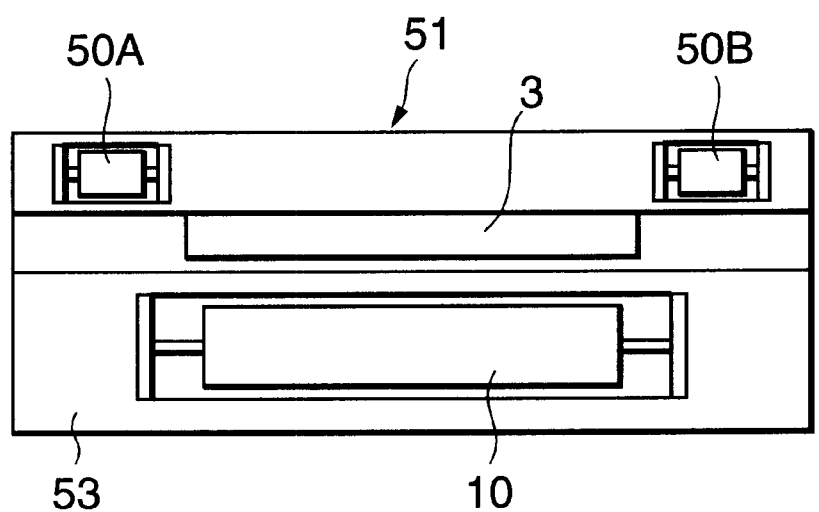
FIG. 3B is a bottom view of the handy type scanner shown in FIG. 3A.
Figure 4A:
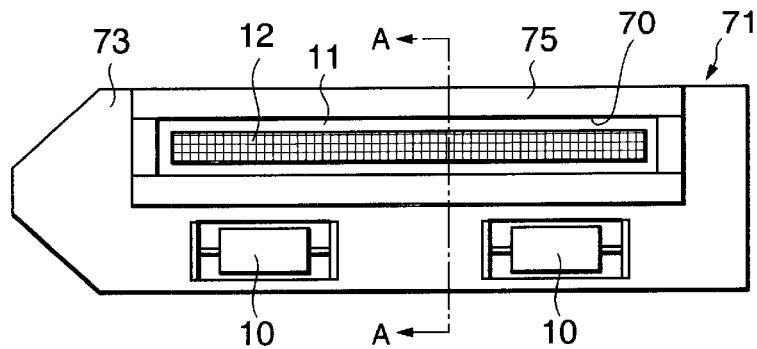
FIG. 4A is a bottom view of a hand type scanner according to the first embodiment of the present invention.
Figure 4B:
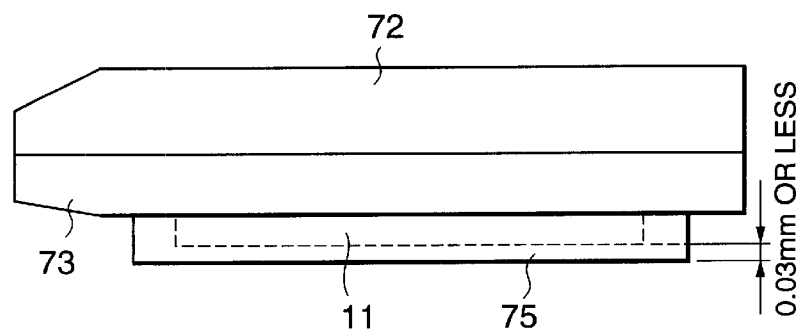
FIG. 4B is a front view of the hand type scanner shown in FIG. 4A.
Figure 4C:
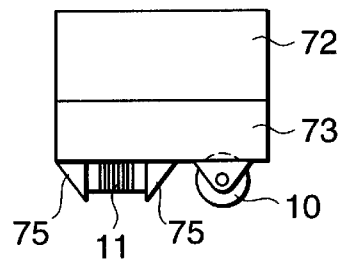
FIG. 4C is a right side view of the handy type scanner shown in FIG. 4B.
Figure 4D:
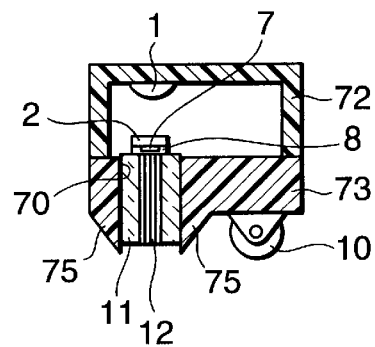
FIG. 4D is a schematic cross section taken along a line A—A in FIG. 4A.

As shown in FIG. 4D, an image sensor substrate 2 of a contact type image sensor shown in FIG. 2 is mounted on the FAP 11 and an LED array 1 is provided immediately above the image sensor substrate 2. A unit such as a rotary encoder (not shown) for detecting a moving distance of the handy type scanner on the original in a sub scan direction on the basis of an amount of rotation of the rollers 10 is connected to the rollers through a gear train (not shown). Furthermore, circuit elements for transmitting signals externally from the image sensor substrate are mounted on, for example, a printed circuit board (not shown) in the housing 71.

As mentioned, the banks 75 each having a tapered cross section are formed on the lower surface of the bottom plate 73 along the longer sides of the rectangular opening portion 70. The rectangular opening portion 70 is formed to expose the lower portion of the FAP 11 in the lower surface of the bottom plate 73. A difference is downward height between the bank portion and the FAP 11 measured from the lower surface of the bottom plate 73 is preferably 0.03 mm or less for the reason to be described later. Although the bank portion may be formed such that it completely surrounds the periphery of the FAP 11, it is unnecessary to provide such bank portion along shorter sides of the opening portion 70, that is, in the sub scan direction, in order to avoid degradation of a sliding smoothness of the handy type image scanner. However, in view of mechanical strength of the bottom plate 73, it is preferable to also provide a bank, which is similar in configuration to the bank 75 and has a height smaller than the height of the bank 75, along each of the shorter sides of the opening portion. When the downward height of the bank 75 measured from the lower surface of the bottom plate 73 is, for example, 0.5 mm, the height of the bank on the shorter side of the opening portion may be substantially the same as the height of the FAP 11 or larger. That is, the height of the bank on the shorter side of the rectangular opening portion may be in a range from a value equal to or larger than 0.47 mm to a value smaller than 0.5 mm.

As mentioned, the banks of the bank portion, which extend along the main scan direction, function to prevent the FAP 11 from directly contacting with the surface of the original and the banks of the bank portion, which extend along the shorter sides of the rectangular opening portion in the sub scan direction and connect between the longer side banks, and function to prevent the mechanical strength of the bottom plate 73 from being reduced due to formation of the rectangular opening portion. Furthermore, when the bank portion is formed to completely surround the periphery of the rectangular opening portion in which the FAP 11 is exposed, external light, which has no relation to the reading of the original, incident on optical sensor elements 7 can be restricted. Therefore, it is preferable that the height of the shorter side banks is within a range from a value with which the shorter side bank does not contact with the surface of the original to a value equal to or larger than the height distance of the FAP 11. Furthermore, since the bottom plate 73 and the banks 75 can be formed simultaneously by plastic molding, metal die-casting or metal pressing, there is no additional matter required in view of parts construction.

U.S. Pat. No. 4,707,747 discloses a hand-held scanner input device employing an optical fiber plate, in which the optical fiber plate is arranged inside of a bottom plate of a sensor body and is covered by a window frame provided in a plane of the lower surface of the bottom plate. Therefore, a distance between the optical fiber plate and an original becomes large necessarily. Consequently, in order to obtain high resolution of the scanner, it is necessary to make the aperture number of optical fiber small. In such case, transmittance of optical fiber becomes small, so that it is necessary to use a light source capable of emitting intenser light.

Contrary to the disclosed prior art, in the present invention, the FAP 11 protrudes downward from the lower surface of the bottom plate so that the distance between the original and the optical fibers can be minimized. Therefore, it is possible to make the aperture number of optical fiber large to thereby improve the transmittance of the optical fibers. In addition, since the distance between the surface of the original and the optical fibers is small, it is possible to block unnecessary external light. It should be noted that there is neither teaching nor suggestion in U.S. Pat. No. 4,707,747 as to the present structure in which the optical fiber plate is protrudes from the bottom plate of the sensor body.

An operation of the present contact type image sensor shown in FIGS. 4A to 4D will be described with reference to FIG. 2. The present contact type image sensor is substantially the same as that shown in FIG. 2 except mainly that the bank portion including the banks 75 surrounding the FAP 11 is provided.

Illumination light 5 emitted from the LED array 1 illuminates the sensor elements 7 arranged one dimensionally on the image sensor substrate 2. The illumination light 5 passes through a plurality of the holes formed in a sensor element chip and a periphery thereof of each sensor element 7 into the optical fibers 12 to illuminate the original 4. The signal light 6, which is the illumination light 5 reflected by the original 4, passes through the optical fibers 12 in reverse direction to the sensor elements 7 by which respective signals are read out. Thus, the reading in the main scan direction becomes possible.

Now, an operation of the handy type scanner equipped with the contact type image sensor will be described with reference to FIGS. 4A to 4D. The scanning in the sub scan direction is performed by manually sliding the scanner along the surface of the original 4 with an aid of the rollers 10. In this case, the amount of relative movement of the original 4 is converted into an electric signal by the rotary encoder operatively connected to the rollers 10 through the gear train, with which the read position of the scanner with respect to the original can be detected.

When the signal in the sub scan direction is obtained after the reading in the main scan direction is completed, the reading in the next main scan direction is performed again. By repeating such operation sequentially, it becomes possible to read the two dimensional original 4.

Since the banks 75 having the tapered cross section and height larger than the height of the FAP 11 from the lower surface of the bottom plate 73 by 0.03 mm or less are formed to surround the FAP 11, the FAP 11 does not contact with the original. Instead thereof, the banks 75 and the rollers 10 are in direct contact with the original 4. Although the cross section of the bank 75 is a right-angled triangle with the side thereof on the side of the FAP 11 being vertical for space economy, the configuration of bank may be any triangular protrusion.

Figure 5:
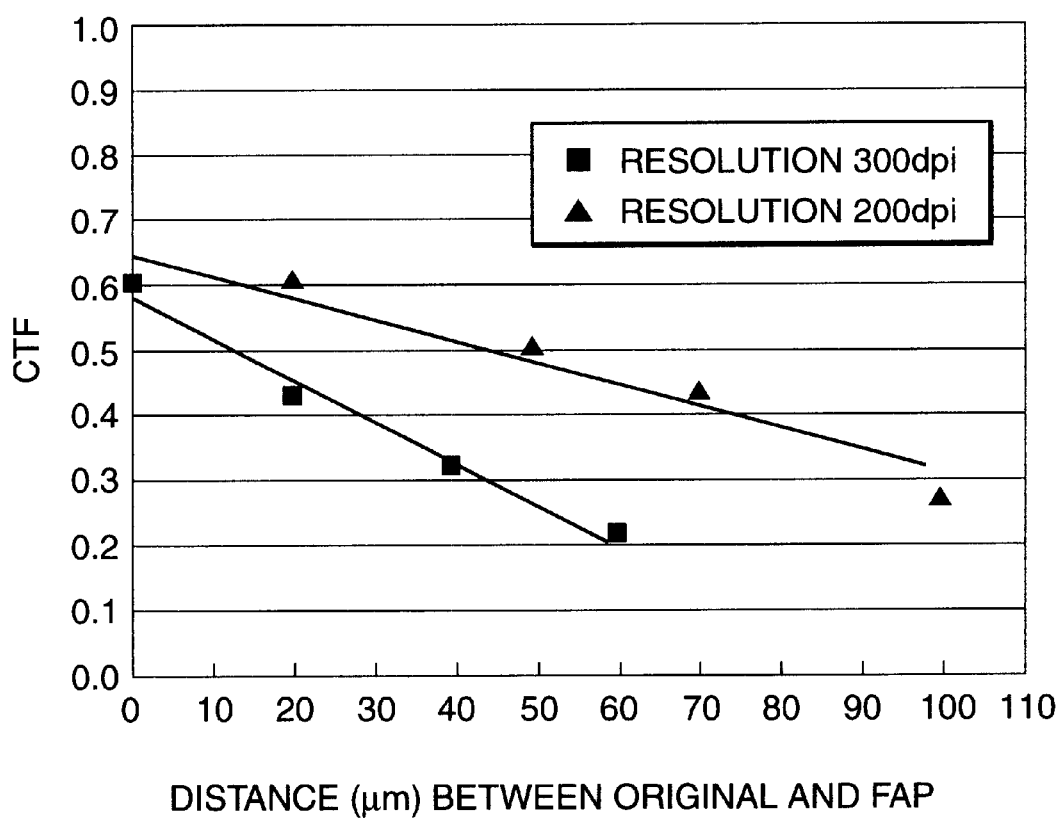
FIG. 5 is a graph showing a relation between distance between an original and an FAP and contrast transfer function (CTF) of a handy type scanner according to the present invention.

The difference in height between the bank portion 75 and the FAP 11 is selected as 0.03 mm or less for the reason to be described with reference to FIG. 5, which is a graph showing a result of measurement of CTF of the contact type image sensor with a distance between the FAP 11 and the surface of the original being used as a parameter. In FIG. 5, ordinate indicates CTF in percentage and abscissa indicates the distance in micron, and a line indicated by black triangle marks is for a case where the optical sensor element 7 has a resolution of 200 dpi and a line indicated by black square marks is for a case where the optical sensor element has a resolution of 300 dpi. When the difference is 0.03 mm (30 $\mu$m), CTF for the optical sensor element having resolution of 200 dpi is 55% and for the optical sensor element having resolution of 300 dpi is 40%. Since CTF for the both cases exceeds 30%, degradation of the resolution is within a tolerable range when the tapered bank portion 75 having the height smaller than the height of the FAT 11 by 0.03 mm is provided on the lower surface of the bottom plate 73. In FIG. 5, CTF of the optical sensor element having resolution of 300 dpi becomes 30% or more when the distance between the surface of the original and the lower end of the FAP is 0.045 mm or less and CTF of the optical sensor element having resolution of 200 dpi becomes 30% or more when the distance between the surface of the original and the lower end of the FAP is 0.1 mm or less.

Incidentally, CTF substantially corresponds to modulation transfer function (MTF) of resolution, which is a transfer function of optical system information introduced for representing the space frequency characteristics of human visual sensation. In order to quantify the degree of gradation of an image in a scanner system or an image input system. CTF is utilized. Resolution MTF is represented by the following equation, where Lmax and Lmin are maximum and minimum values of pattern luminance, respectively:

$$MTF=(L\max-L\min)/(L\max+L\min)$$

CTF can be evaluated by similar values and it is evaluated in view of human ability of recognition when CTF=0.3. From the above, it can be understood that the height of the bank portion 75 measured from the lower surface of the bottom plate is made larger than the height of the FAP 11 by a value determined according to the resolution of the optical scanner elements to be used.

A handy type scanner according to the second embodiment of the present invention will be described with reference to FIGS. 6A to 6D. In this embodiment, a bank portion on a lower surface of a bottom plate 73 includes a pair of parallel banks 751 extending along longer sides of a rectangular opening portion, respectively, and each bank 751 has a quarter rounded apex in cross section.

In the first embodiment shown in FIGS. 4A to 4D, the bank 75 has the right-angled triangle cross section with the oblique side thereof being outside of the opening portion formed in the bottom plate and with the vertical side apex thereof being in a line contact with the original. Therefore, there is a possibility that the apex hitches the original when the surface of the original is soft or irregular, resulting in degradation of operability of the handy type scanner.

Figure 6A:
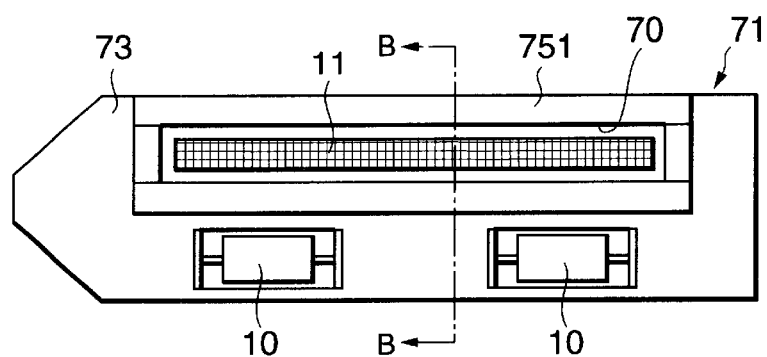
FIG. 6A is a bottom view of a handy type scanner according to the second embodiment of the present invention.
Figure 6B:
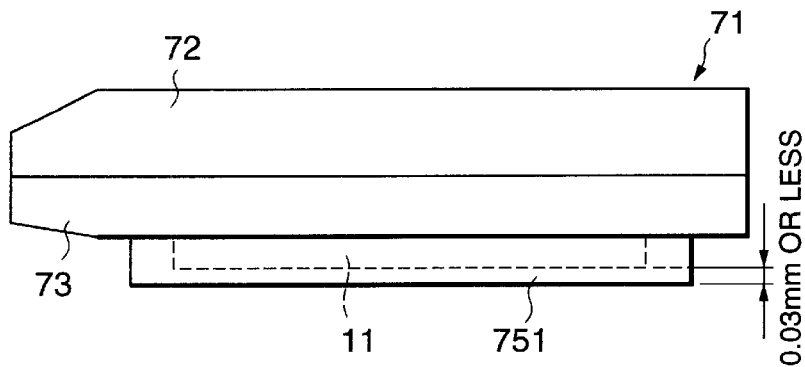
FIG. 6B is a front view of the handy type scanner shown in FIG. 6A.
Figure 6C:
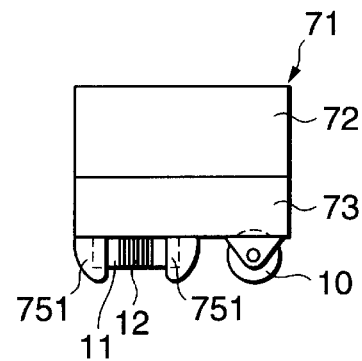
FIG. 6C is a right side view of the handy type scanner shown in FIG. 6B.

As shown in FIG. 6C, the apex of the bank 751 of the second embodiment has the quarter round cross section so that it becomes in area contact with a surface of the original. Therefore, it becomes possible to relatively move the scanner with respect to the original smoothly without hitching even when the surface of the original is soft or irregular.

Figure 6D:
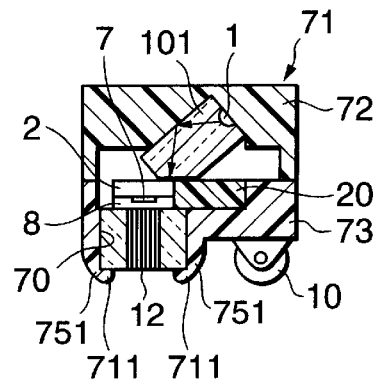
FIG. 6D is a schematic cross section taken along a line B—B in FIG. 6A.

Furthermore, as shown in FIG. 6D, the quarter rounded apex of the bank 751 includes a hook portion 711 with which an FAP 11 is hooked. Therefore, a distance between lower ends of the opposing hook portions 711 is smaller than a length of the shorter side of opening portion.

An operation of the scanner of this embodiment with respect to the original is similar to that of the first embodiment. Height of the banks 751 is larger than a height of the FAP 11 measured from the lower surface of the bottom plate 73 by 0.045 mm or less, preferably, 0.03 mm or less, and the height of rollers 10 is preferably equal to the height of the banks 751.

An internal structure of the sensor body of the second embodiment may be the same as that of the first embodiment. However, in the second embodiment, the internal structure is modified in such a way that light emitted from an LED array 1 is directed from a chamfered facet of an optical guide plate 101 having one end equipped with the LED array 1 constituting three primary color lights to the sensor substrate 2 as shown in FIG. 6D. A printed circuit board 20 electrically connected to the sensor substrate 2 is provided adjacent to the sensor substrate 2 to support the optical guide plate 101.

Figure 7A:
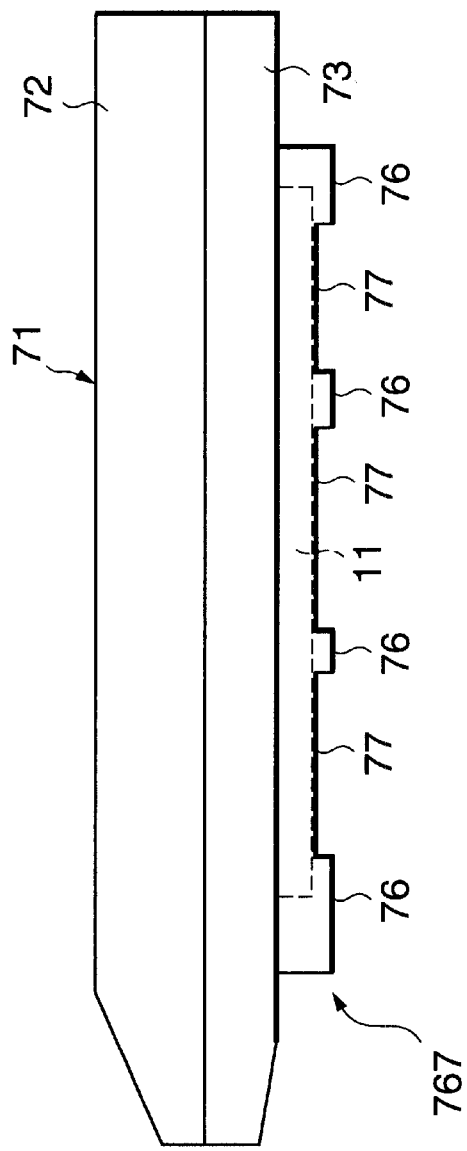
FIG. 7A is a front view of the handy type scanner according to the third embodiment of the present invention.

The third embodiment of the present invention will be described with reference to FIGS. 7A and 7B. In a handy scanner 71 including a cover portion 72 and a bottom plate 73, shown in FIGS. 7A and 7B, a bank portion protruding downward from a lower surface of the bottom plate 75 is constituted with a pair of parallel banks 767. Each bank 767 includes a plurality of land portions 76 each having a quarter round cross section and a plurality of valley portions 77 each having an analogous quarter round cross section to form an irregular configuration. A plane defined by lower surfaces of the land portions 76 is lower in vertical level than a lower end of a FAP 11 by 0.03 mm or less and a plane defined by lower surfaces of the valley portions 77 is substantially in the same vertical level as that of the lower end of the FAP 11.

With this construction, a contact area between the bank portion and an original is further reduced, so that it is possible to reduce the possibility of vibration of the scanner due to friction between the bank portion and the original.

Figure 7B:
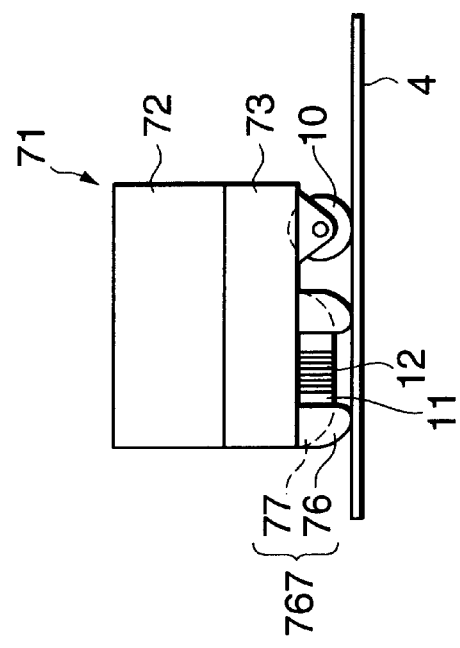
FIG. 7B is a right side view of the handy type scanner shown in FIG. 7A.

In the third embodiment, the cross sectional configurations of the land portion 76 and the valley portion 77 of the bank 767 may be sawteeth, respectively, although the quarter round cross sections are shown in FIG. 7B. The level of the lower ends of rollers 10 is substantially the same as the level of the lower surfaces of the land portions 76 of the banks 767. Furthermore, although the banks 767 are formed in only a main scan direction, mechanical strength of the bottom plate 73 can be further improved by providing banks, whose height is slightly smaller than the height of the banks 767 and and which extends in the sub scan direction, on shorter sides of a rectangular opening, as mentioned with respect to the first embodiment.

Figure 8A:
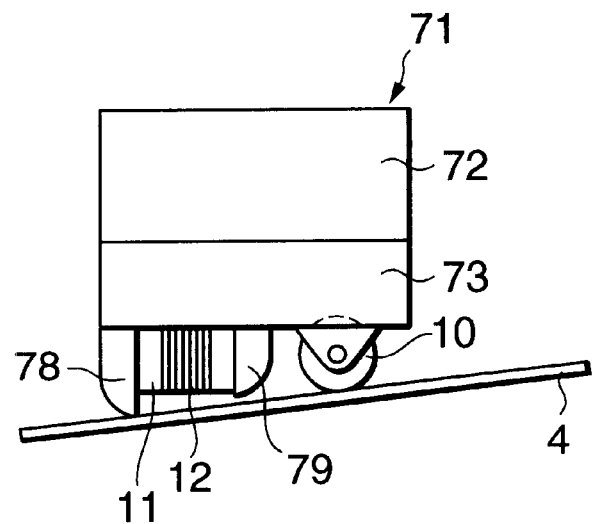
FIG. 8A is a side view of a handy type scanner according to the fourth embodiment of the present invention.

A handy scanner 71 according to the fourth embodiment of the present invention will be described with reference to FIG. 8A. As shown in FIG. 8A, the handy scanner 71 is composed of a cover portion 72 and a bottom plate 73. A bank portion includes a bank 78 formed along a longer side of a rectangular opening formed in a bottom plate 73, which is remote from rollers 10, and a bank 79 formed along the other longer side of the opening. Height of the bank 78 is larger than height of a FAP 11 by 0.03 mm or less and height of the bank 79, which is closer to the rollers, is smaller than the height of the bank 78. The height of the rollers 10 may be smaller than the height of the bank 79.

Figure 8B:
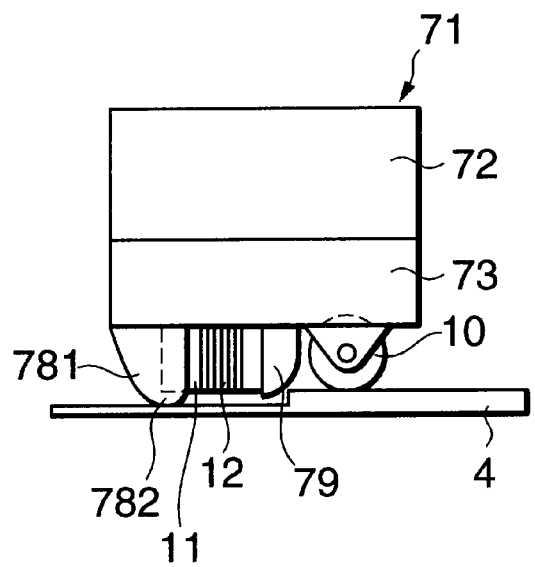
FIG. 8B is a side view of the handy type scanner shown in FIG. 8A when applied to another original.

FIG. 8B shows a modification of the embodiment shown in FIG. 8A, which is suitable for use with an original 4 containing step portion. In the modification shown in FIG. 8B, the bank 78 of the scanner shown in FIG. 8A is replaced by a bank 781. The positional relation in vertical and horizontal directions between the banks 79 and 781 and the rollers 10 is the same as that shown in FIG. 8A. When an original 4 having, for example, a step portion is scanned in the sub scan direction by this handy scanner, it is possible to smoothly read an image of the original without hitching regardless of existence of the step portion on the original, by defining a lower surface level of the scanner with the rollers 10 and the bank 781 higher than the rollers so that the lower surface of the scanner is inclined with the bank 79 being in between the rollers 10 and the bank 781.

With this construction, the friction between the bank 781 and the original 4 is reduced and the smoothness of movement of the scanner is further improved with respect to the original. Furthermore, since the distance between the original 4 and the FAP 11 becomes smaller, the gradation of picked-up image is improved. In this modification, a pent roof portion 782 is formed in the lower end of the bank 781 as shown in FIG. 8B. The pent roof portion 782 is similar to the left side bank 751 shown in FIGS. 6C and 6D and supports one side of the FAP 11.

It is, of course, possible to further improve the performance of the handy scanner by suitably combining the first to four embodiments mentioned hereinbefore. In each of the embodiments, the present handy scanner has been described as to be relatively moved manually in the sub scan direction with respect to the original. However, it is possible to fix the scanner and to feed the original with respect to the fixed scanner.

According to the present invention, the rigidity, that is, the mechanical strength, of the bottom plate 73 is improved by providing the bank portion surrounding the rectangular opening portion 70 formed for downwardly protruding the FAP 11 from the lower surface of the bottom plate 73. Therefore, it becomes possible to prevent the irregularity of rotation of the rollers 10 caused by bending and/or warping of the bottom plate from being degraded.

Since it becomes possible to surround the FAP 11, which includes a glass plate and a plurality of optical fibers embedded in the glass plate, by the bank portion, it is possible to prevent the FAP 11 from being broken even when the scanner is erroneously dropped down. It is further possible to restrict immigration of unnecessary external light to the FAP 11.

Furthermore, when the tapered bank portion extending downward from the lower surface of the bottom plate 73 over the FAP 11 by 0.03 mm or less is provided, the FAP 11 can not be in direct contact with the upper surface of the original. Therefore, friction between the original and the FAP 11 is reduced, so that the scanner does not hitch the surface of the original and a smooth relative movement of the scanner with respect to the original can be realized even when the surface of the original is irregular. Consequently, it becomes possible to reduce distortion of image caused by the hitching or the vibration of the scanner.

Although the present invention has been described with reference to specific embodiments, this description is not meant to be construed in a limiting sense. Various modifications of the disclosed embodiments will become apparent to persons skilled in the art upon reference to the description of the invention. It is, therefore, contemplated that the appended claims will cover any modifications or embodiments as fall within the true scope of the invention.

What is claimed is:

1. A handy scanner comprising:

a housing having a bottom plate equipped with rollers in a bottom portion thereof;

an opening portion formed in said bottom plate and extending along a rotation axis of said rollers;

an optical fiber array plate provided in said housing and exposed externally through said opening portion;

an optical sensor provided above said optical fiber array plate in said housing and adapted to detect signal light passed through said optical fiber array plate; and a downwardly protruding bank portion provided on a lower surface of said bottom plate and surrounding said opening portion, for preventing said optical fiber array plate exposed externally on said lower surface of said bottom plate from being in direct contact with an upper surface of an original to be scanned, wherein downward protruding distances of said bank portion and said rollers are determined such that at least a portion of said bank portion and said rollers can be in contact with said upper surface of said original simultaneously.

2. A handy scanner as claimed in claim 1, wherein said bank portion has a right-angled triangle cross section and an oblique side of the right-angled triangle is located on a remote side of said opening portion from said optical fiber array plate.

3. A handy scanner as claimed in claim 1, wherein said bank portion has a quarter round cross section and an arced area of the quarter round cross section is located on a remote side of said opening portion from said optical fiber array plate.

4. A handy scanner as claimed in claim 1, wherein said optical fiber array plate protrudes downward from said lower surface of said bottom plate and a difference in distance measured from said lower surface of said bottom plate between said lower ends of said bank portion and said optical fiber array plate is set to a value with which contrast transfer function of said handy scanner becomes 30% or more.

5. A handy scanner as claimed in claim 4, wherein the difference in distance measured from said lower surface of said bottom plate between said lower ends of said bank portion and said optical fiber array plate is set to a value of 0.1 mm or less when resolution of said optical sensor is 200 dpi.

6. A handy scanner as claimed in claim 4, wherein the difference in distance measured from said lower surface of said bottom plate between said lower ends of said bank portion and said optical fiber array plate is set to a value of 0.045 mm or less when resolution of said optical sensor is 300 dpi.

7. A handy scanner as claimed in claim 1, wherein said bank portion is provided to surround said opening portion completely and a downward protruding distance of at least a portion of said bank portion remote from said rollers is larger than that of said rollers.

8. A handy scanner as claimed in claim 7, wherein the downward protruding distance of said bank portion between said rollers and said optical fiber array plate is set to a value equal to the downward protruding distance of said rollers.

9. A handy scanner as claimed in claim 8, wherein the downward protruding distance of said bank portion between said rollers and said optical fiber array plate is set to a value equal to a downward protruding distance of said optical fiber array plate.

10. A handy scanner comprising:
   a housing having a bottom plate equipped with rollers in a bottom portion thereof;
   a rectangular opening portion formed in said bottom plate and extending along a rotary shaft of said rollers;
   an optical fiber array plate provided in said housing and exposed externally through said rectangular opening portion;
   an optical sensor provided above said optical fiber array plate in said housing and adapted to detect signal light passed through said optical fiber array plate;
   a light source provided above said optical sensor; and
   a downwardly protruding bank portion provided on a lower surface of said bottom plate and surrounding said opening portion, for preventing said optical fiber array plate exposed externally on said lower surface of said bottom plate from being in direct contact with an upper surface of an original to be scanned,
wherein downward protruding distances of said bank portion and said rollers are determined such that at least a portion of said bank portion and said rollers can be in contact with said upper surface of said original simultaneously and a distance of a lower end of said bank portion measured from said lower surface of said bottom plate is larger than that of said optical fiber array plate by 0.1 mm or less.

11. A handy scanner as claimed in claim 10, wherein said bank portion is provided to surround said rectangular opening completely to thereby improve mechanical strength of said rectangular opening portion.

12. A handy scanner as claimed in claim 10, wherein a lower end of said bank portion is provided with a pent roof portion to cover a periphery of said optical fiber array plate.

13. A handy scanner as claimed in claim 10, wherein said light source is constructed with an optical guide plate having one end provided with a light source emitting three primary color lights.

14. A handy scanner as claimed in claim 10, wherein said bank portion has a right-angled triangle cross section and an oblique side of the right-angled triangle is located on a remote side of said opening portion from said optical fiber array plate.

15. A handy scanner as claimed in claim 10, wherein said bank portion has a quarter round cross section and an arced area of the quarter round cross section is located on a remote side of said opening portion from said optical fiber array plate.

16. A handy scanner as claimed in claim 10, wherein said bank portion includes a pair of banks provided along respective longer sides of said rectangular opening portion.

17. A handy scanner as claimed in claim 10, wherein said bank portion has irregularity along its extending direction.

18. A handy scanner comprising:
   a housing having a bottom plate equipped with rollers in a bottom portion thereof, said rollers being in contact with an original and being adapted to detect a rotation angle of said rollers in a main scan direction of said original;
   an optical fiber array plate mounted on an opening portion provided in said bottom plate for guiding signal light to an image read portion provided within said housing; and
   a downwardly protruding bank portion provided on a lower surface of said bottom plate and surrounding a periphery of said opening portion completely, for preventing a lower end of said optical fiber array plate from being in direct contact with an upper surface of an original to be scanned and improving a mechanical strength of said opening portion,
wherein downward protruding distances of said bank portion and contacting with a surface of said original measured from a lower end of said optical fiber array plate said rollers is 0.03 mm or less.

19. A handy scanner as claimed in claim 18, wherein said bank portion is equal in vertical level to said rollers.

* * * * *